F. M. JOHNSON.
PLASTER SLAB MOLDING MACHINE.
APPLICATION FILED MAY 11, 1921.
1,399,485.
Patented Dec. 6, 1921.
5 SHEETS—SHEET 5.
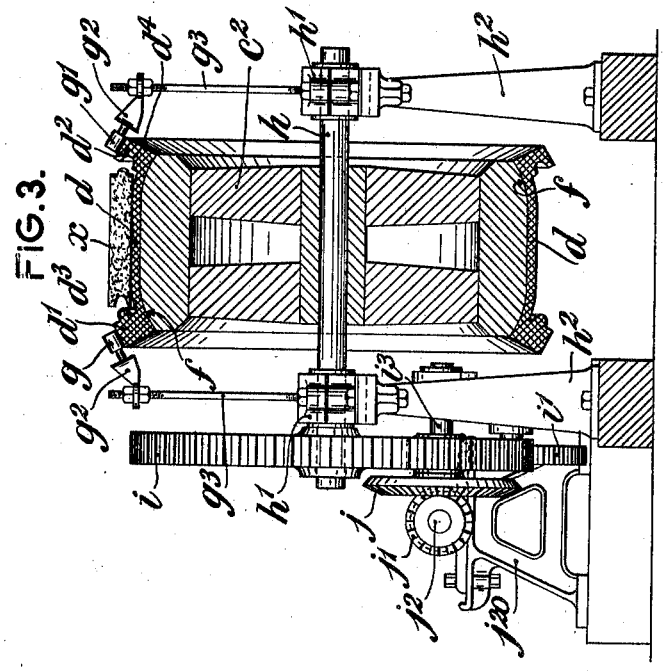
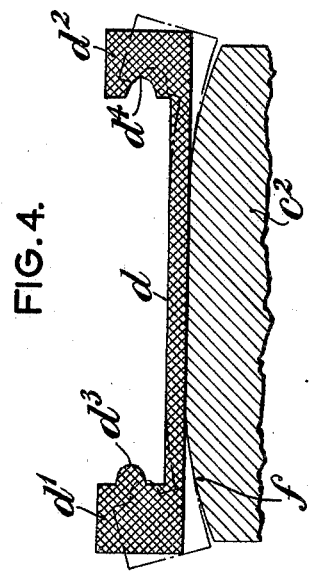
Inventor:
Frank Mihill Johnson.
Attorney:

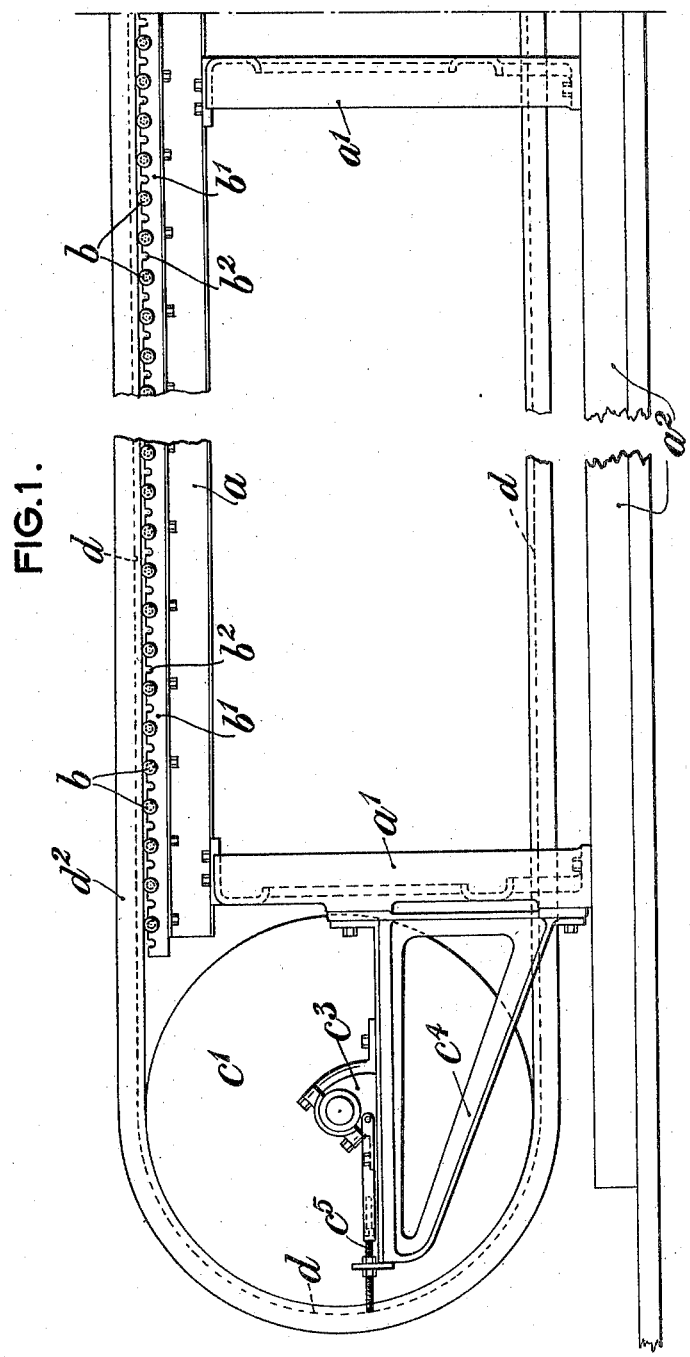

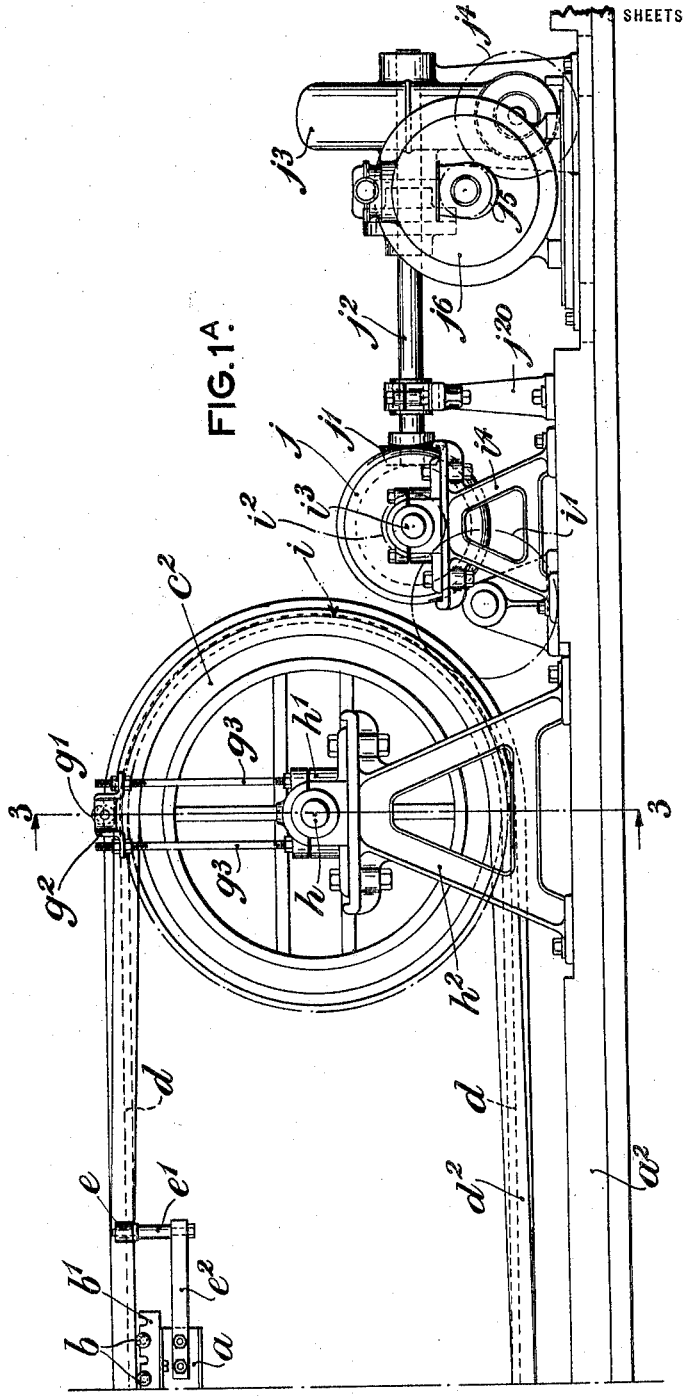

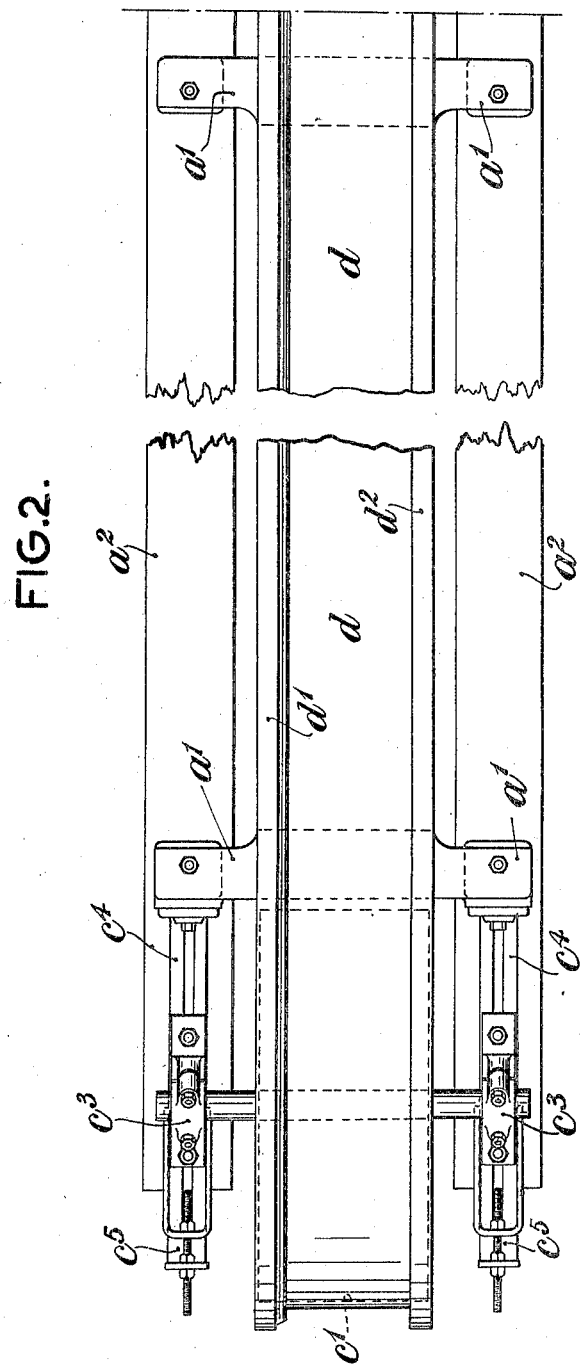

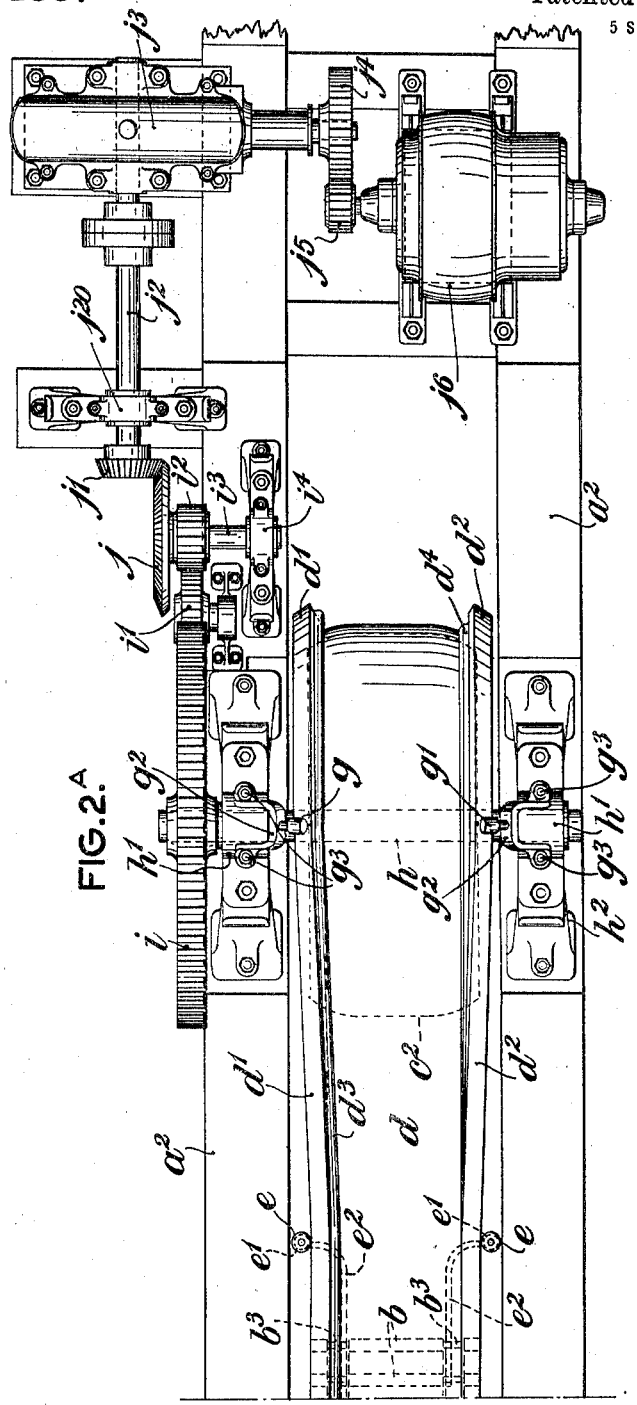

UNITED STATES PATENT OFFICE.

FRANK MIHILL JOHNSON, OF MITCHAM, ENGLAND, ASSIGNOR OF ONE-HALF TO CAFFERATA & CO., OF NEWARK-UPON-TRENT, NOTTINGHAM, ENGLAND.

PLASTER-SLAB-MOLDING MACHINE.

1,399,485.      Specification of Letters Patent.      Patented Dec. 6, 1921.

Original application filed December 15, 1919, Serial No. 345,020. Divided and this application filed May 11, 1921. Serial No. 468,772.

*To all whom it may concern:*

Be it known that I, FRANK MIHILL JOHNSON, of Mitcham, in the county of Surrey, England, manufacturer, a subject of the King of England, have invented certain new and useful Improvements in Plaster-Slab-Molding Machines, of which the following is a specification.

This invention relates to the manufacture of slabs, plates and the like (hereinafter referred to as slabs) of plaster, gypsum or similar plastic material, chiefly for building purposes, and the object is to simplify and expedite the production of said articles in a more or less continuous manner with a minimum of labor and at a relatively low cost.

In the conventional method of manufacture of such articles, a number of mold frames are arranged on a table into which the plaster is poured, the arrangement and setting up of said frames necessitating the use of keys, wedges or other means for securing and adjusting the mold parts, and after the slabs are sufficiently set, said mold parts have to be knocked down again for removal of the slab, these operations requiring considerable time and labor.

According to the machine of the present invention, there is provided a relatively long endless conveyer passing over a stationary table, bench or support, this conveyer being of appropriate material such as vulcanized rubber and being mounted at its ends on rollers, wheels or the like, one or both of which may be capable of being driven from a motor suitably arranged according to requirements whereby the conveyer is moved slowly over the table. The conveyer is formed with integral side members, suitably provided with a projection and recess respectively to form the usual keying elements in the slabs. When the slabs have been formed and set and movement imparted to the conveyer, it passes about an end roller of special form having a curved periphery and positioned at a substantial distance from the discharge end of the table, and in so passing about said roller, the aforesaid side members will be drawn down into positions to release the side edges of the slab and allow same to be passed forward, say to another conveyer, on which it may be cut to the desired lengths.

After having started up the machine or apparatus, it may be possible to continue the process uninterruptedly if the rate of movement of the conveyer is such as to permit the material to set within the time occupied by its travel over the length of the molding table, or said movement of the conveyer is controlled either under continuous or intermittent movement in any appropriate manner to allow of a substantially continuous process being carried out.

An embodiment of the invention is illustrated in the accompanying drawings, in which:—

Figures 1 and 1$^a$ taken together constitute a side view of the machine; Figs. 2 and 2$^a$ taken together constitute a plan view thereof. Fig. 3 is a transverse section taken on the line 3—3 of Fig. 1$^a$, and Fig. 4 is a fragmentary detail cross section showing the principle on which the conveyer is caused to free the molded slab.

As shown in the drawings the machine comprises the molding table $a$ of any desired length, supported by standards $a^1$ mounted on a base frame $a^2$, the upper surface of the table being constituted by a large number of transverse rollers $b$, of which alternate ones are shown for clearness, mounted for rotation in side plates $b^1$, provided with recesses $b^2$ for receiving reduced portions $b^3$ of the rollers, as will be readily understood. Over the said table and in contact with the rollers $b$ passes the upper run of an endless conveyer $d$ mounted on end rollers $c^1$ and $c^2$, the former being merely a guiding roller having a flat periphery and shown as mounted in bearings $c^3$ on brackets $c^4$ carried by the end standards $a^1$ at the feed end of the machine. The bearings $c^3$ are adjustable for tensioning the conveyer by means of screw and nut devices $c^5$ of any suitable kind. The conveyer is in the form of a band of somewhat resilient material, such as vulcanized rubber, and has upstanding lateral flanges $d^1$ and $d^2$ shown more clearly in Figs. 3 and 4 forming the side walls of the mold, said flanges being respectively provided with a projection $d^3$ and recess $d^4$ to form the usual keying elements in the slabs to be molded on the conveyer. At the discharge end of the molding table the conveyer is guided laterally and exteriorly by means of rollers $e$ carried by spindles $e^1$ mounted on the ends of arms $e^2$ projecting from the end of the table.

The other roller $c^2$ above referred to acts as the driving roller for the conveyer by means to be described later, and is located at a substantial distance from the adjacent end of the table. This roller constitutes the main essential feature of the invention, and as shown in Figs. 3 and 4, has a curved periphery $f$, about which the conveyer passes in such a manner that the lateral edges or flanges $d^1$ and $d^2$ of said conveyer are drawn downward into the position shown in full lines in Fig. 3 and in broken lines in Fig. 4, so that, as indicated in the former figure the said flanges are released from the lateral edges of the slab $x$ and allow same to be removed or passed forward for cutting into lengths or to be otherwise dealt with as may be required. At the line where the conveyer contacts with the curved periphery of the roller $c^2$ the upper surfaces of the flanges $d^1$ and $d^2$ are acted on by conical rollers $g$, $g^1$ respectively to prevent said flanges riding up off the roller, $c^2$, said conical rollers being shown as carried by straps $g^2$ adjustably mounted on the ends of rods $g^3$ extending vertically upward from the bearings of said roller $c^2$.

The latter roller is carried by a shaft $h$ mounted in bearings $h^1$ in side brackets $h^2$, and for the purpose of driving said roller to move the conveyer over the table the following means are shown:—

On the shaft $h$ is a large gear $i$ with which meshes a smaller gear $i^1$, which in turn meshes with a pinion $i^2$ on a shaft $i^3$ carried in a bracket $i^4$. On said shaft $i^3$ is a bevel wheel $j$ with which gears a smaller bevel wheel $j^1$ on the end of a shaft $j^2$, carried by bracket $j^{20}$, and which through suitable reducing gear contained in casing $j^3$ and through the gears $j^4$ and $j^5$ is driven from an electric motor $j^6$.

From the above description it will be apparent that the conveyer may receive a charge of plaster, cement or other material or compound fed thereto by any appropriate means (not shown), and that when same has sufficiently set, movement is imparted to the conveyer by the means described, and that as the conveyer passes about the curved periphery of the guiding and driving roller $c^2$ beyond the discharge end of the table, the flanges $d^1$ and $d^2$ of the conveyer will be removed from contact with or will free the lateral edges of the cast slab and permit the latter to be removed at will from the conveyer.

This application is a division of my prior application on "Machine for the manufacture of building slabs, etc.," Serial No. 345,020, filed Dec. 15, 1919, the same having matured into Patent No. 1,380,721, granted Dec. 7, 1920.

What I claim as my invention and desire to secure by Letters Patent of the United States is:—

1. A plaster slab molding machine comprising a molding table, an endless conveyer movable over said table and constituting a continuous base for the mold, swinging members disposed one at each side of the conveyer to constitute mold walls, and a roller adjacent the delivery end of the table having a curved periphery about which the conveyer passes to move said swinging members apart.

2. A plaster slab molding machine comprising a molding table, an endless conveyer of resilient material movable over said table and constituting a continuous base for the mold, lateral upstanding members integral with said conveyer disposed one at each side thereof to constitute mold walls, and a roller adjacent the delivery end of the table having a curved periphery about which the conveyer passes to move said upstanding members apart and free the lateral edges of the molded slab.

3. A plaster slab molding machine comprising a molding table, a plurality of transverse rollers forming the upper surface of said table, an endless conveyer of resilient material movable over said rollers, and constituting a continuous base for the mold, lateral upstanding members integral with the conveyer disposed one at each side thereof to constitute mold walls, a roller adjacent the delivery end of the table, having a curved periphery about which the conveyer passes to move said upstanding members apart and free the lateral edges of the molded slab, and mechanism for driving said last mentioned roller whereby the conveyer is moved over the table.

In witness whereof I have signed this specification in the presence of two witnesses.

FRANK MIHILL JOHNSON.

Witnesses:
 MABEL E. MARTIN,
 CONSTANCE E. HAYNES.